United States Patent

[11] 3,577,852

| [72] | Inventor | Bodo Futterer<br>Luzern, Switzerland |
|---|---|---|
| [21] | Appl. No. | 749,364 |
| [22] | Filed | Aug. 1, 1968 |
| [45] | Patented | May 11, 1971 |
| [73] | Assignee | The Gillette Company<br>Boston, Mass. |

[54] CUTTING HEAD FOR MOTOR-DRIVEN SHAVERS
2 Claims, 2 Drawing Figs.

[52] U.S. Cl. .................................................. 30/43.92
[51] Int. Cl. ..................................................... B26b 19/02

[50] Field of Search............................................ 30/43.4-
—43.92, 346.51, 346.53, 346.54

[56] References Cited
UNITED STATES PATENTS

| 3,178,818 | 4/1965 | Liska............................ | 30/346.53X |
| 3,203,829 | 8/1965 | Seyer............................ | 30/346.53X |

*Primary Examiner*—Othell M. Simpson
*Attorney*—Arthur Schwartz

ABSTRACT: The undersurface, or at least the undersurface adjacent the openings in the movable cutting head of a dry shaver are coated with an antiadhesive material such as polytetrafluorethylene.

Patented May 11, 1971                    3,577,852

CUTTING HEAD FOR MOTOR-DRIVEN SHAVERS

BACKGROUND AND OBJECTS

This invention relates to the movable cutting head of a two-foil head for a motor-driven dry shaver. In the currently known motor-driven dry shavers, the cutting heads have cutting or shearing parts, such as a knife arrangement, which perform a rotating or reciprocating motion with respect to a fixed shearing plate or shearing foil. The cutting parts are commonly in the form of perforations.

These cutting heads have the disadvantage that the cutting effect deteriorates during the course of use and time. Experiments have shown that this deterioration is based on the fact that, with longer use, hair and skin particles are deposited along all possible places on the cutting head, particularly the side surfaces of the movable part of the cutting head. They then become hardened and unfavorably alter the cutting angle of the cutting edges, similar to the effect of material being built up on the edge of a turning tool. Furthermore, this deposit, in the course of time, leads to a corrosion phenomena and thus to a further deterioration in the cutting performance. This deposit cannot be removed by customary cleaning methods, for example, using small brushes.

An object of the invention is to provide a cutting head which has a continually equally good cutting performance.

This above problem can be solved by providing those surfaces of the parts of the cutting head which do not glide upon each other with an antiadhesive coating. Thus hair and skin particles do not adhere at said surfaces.

It is of course known that friction surfaces can be provided with antiadhesive coatings to reduce the friction coefficient. But this, in the case of cutting heads of motor-driven shavers, does not produce the effect desired by the invention.

SUMMARY

In accordance with the invention, an antiadhesive coating can be put on a cutting head in the known manner, or a substance having the antiadhesive coating in suspension is used as a component of a shaving liquid. The shaving liquid is then placed in contact with the cutting head.

BRIEF DESCRIPTION OF THE DRAWINGS

These and other objects of the invention are more fully described below in conjunction with the schematic drawings, illustrating one example of the invention, wherein.

DETAILED DESCRIPTION

Figure 1:
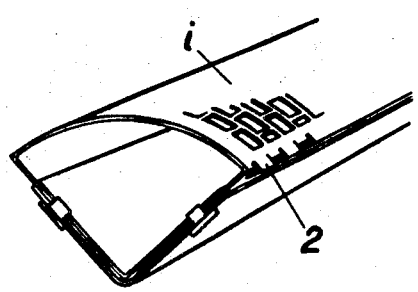
FIG. 1 shows a perspective view of the movable part of the shearing head of a dry shaver.
Figure 2:
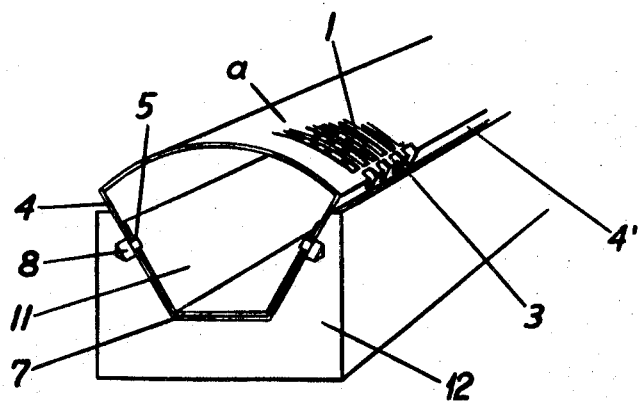
FIG. 2 shows a perspective view of the fixed part of the shearing head of a dry shaver.

A movable part 2 of the shearing head, shown in FIG. 1, grips a cutting foil which is provided with an opening and which is bent along two side edges. This cutting foil is clamped in a device, and it is placed in the inside space of the outer shearing foil shown in FIG. 2 when in operation. The outer shearing foil is bent along edges 3 and is fastened along edge areas 4 by means of a retaining cradle 11 in a bearing 12. A plurality of pins 8 extend through openings 5 of retaining cradle 11.

A base area 7 of the retaining cradle 11 rests on bearing 12. Bearing 12 is removably attached to a shaver in the known manner (not shown here). Much of this structure is illustrated in copending application, Ser. No. 651,492, filed July 6, 1967.

In accordance with the invention, at least the inside or undersurface of the curved area $i$ or movable part 2 is covered with a coating made of polytetrafluorethylene. This coating prevents the shaving dust from being deposited along the edge areas of the rectangular cutting openings or perforations. As a result, the cutting properties will remain constant even with longer use. It is noted that at least the under-areas surrounding the cutting openings seen in FIG. 1 are so coated.

Coating the arched surface of the fixed shearing leaf 1—such as it might be applied to reduce the friction in the known manner—is not part of the invention here.

Rather than placing the coating of polytetrafluorethylene onto the undersurface of the cutting head, the antiadhesive material may be placed in the form of a suspension in shaving liquid. This form of the invention will also fall within the realm of the objects since the adherence of hair and skin particles to the cutting head openings will not occur.

I claim:

1. In a twin-foil cutting head for use in dry shavers having:
    a. a movable inner foil, said inner foil having a substantially flat surface thereon.
    b. an outer foil also having a substantially flat surface positioned adjacent to and cooperating with said inner foil flat surface,
    c. said outer foil flat surface having cutting openings therein,
    d. said inner foil flat surface having a plurality of cutting openings,
    e. said inner foil cutting openings cooperating with said outer foil cutting openings for cutting hairs when said inner foil is moved relative to said outer foil, said inner foil flat surface having an undersurface,
    f. the improvement comprising: said undersurface and said inner foil cutting openings having an antiadhesive coating thereon.

2. A movable cutting head as defined in claim 1 wherein said antiadhesive coating is polytetrafluorethylene.